(12) United States Patent
Barrett et al.

(10) Patent No.: US 8,343,294 B2
(45) Date of Patent: Jan. 1, 2013

(54) METHOD FOR ENHANCING THE FATIGUE LIFE OF A STRUCTURE

(75) Inventors: Ronald M. Barrett, Lawrence, KS (US);
Caroline R. Bennett, Lawrence, KS (US); Stanley T. Rolfe, Lawrence, KS (US); Adolfo B. Matamoros, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 0 days.

(21) Appl. No.: 13/524,847

(22) Filed: Jun. 15, 2012

(65) Prior Publication Data
US 2012/0246937 A1      Oct. 4, 2012

Related U.S. Application Data

(62) Division of application No. 12/687,840, filed on Jan. 14, 2010, now Pat. No. 8,202,378.

(60) Provisional application No. 61/144,705, filed on Jan. 14, 2009.

(51) Int. Cl.
*B23P 6/00* (2006.01)

(52) U.S. Cl. ...... 156/98; 156/94; 29/402.01; 29/402.06; 29/402.09; 29/402.11; 29/402.12; 29/402.14; 29/402.19; 52/514

(58) Field of Classification Search .......... 156/94, 156/98; 29/402.01, 402.06, 402.09, 402.11, 29/402.12, 402.14, 402.19, 897.1; 52/514
See application file for complete search history.

(56) References Cited

U.S. PATENT DOCUMENTS

| | | | | |
|---|---|---|---|---|
| 2,361,106 | A | * | 10/1944 | Jensen ...................... 29/402.11 |
| 5,111,570 | A | * | 5/1992 | Baumgarten et al. ...... 29/402.09 |
| 7,000,303 | B2 | * | 2/2006 | Talwar et al. ............. 29/402.01 |

* cited by examiner

*Primary Examiner* — Khanh P Nguyen
*Assistant Examiner* — John Blades
(74) *Attorney, Agent, or Firm* — West & Associates, A PC; Stuart J. West; Shaun N. Sluman

(57) ABSTRACT

An apparatus and method adapted to enhance the structural performance of a desired connection and provide a readily perceivable indication of predetermined limitations having being reached prior to actual failure of a connection. A method for enhancing structural performance of a desired structure by preventing fracture propagation.

7 Claims, 19 Drawing Sheets

FIG. 1 --PRIOR ART--

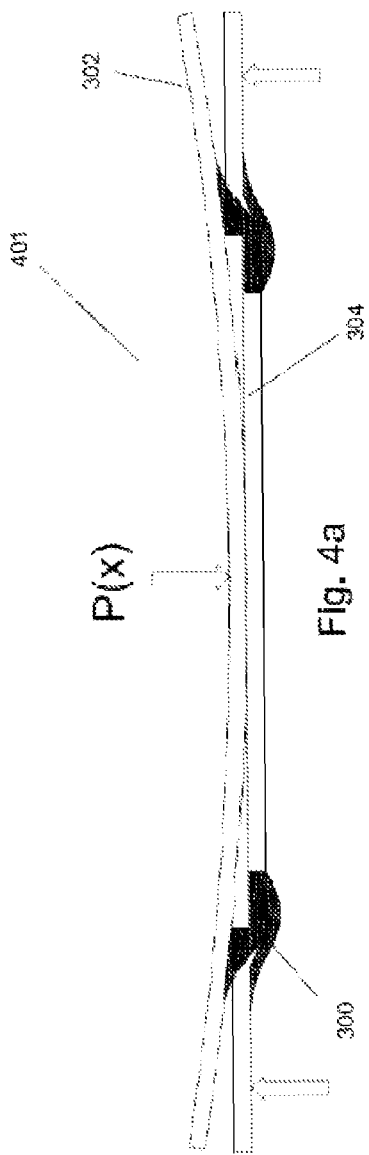
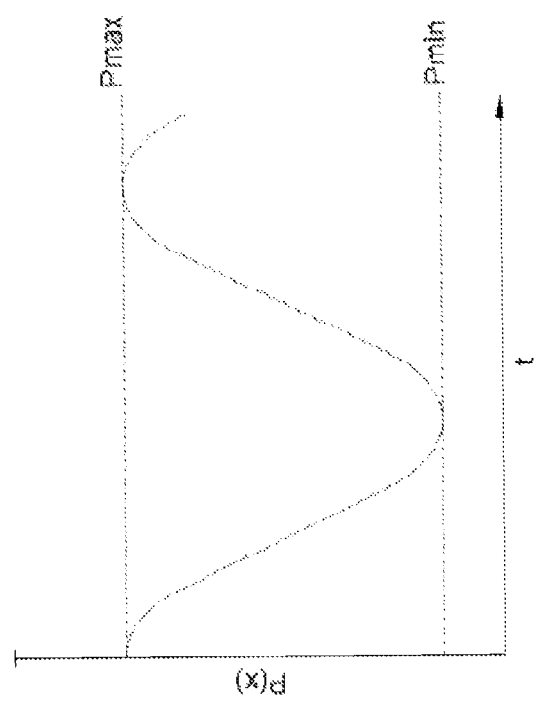
FIG. 4

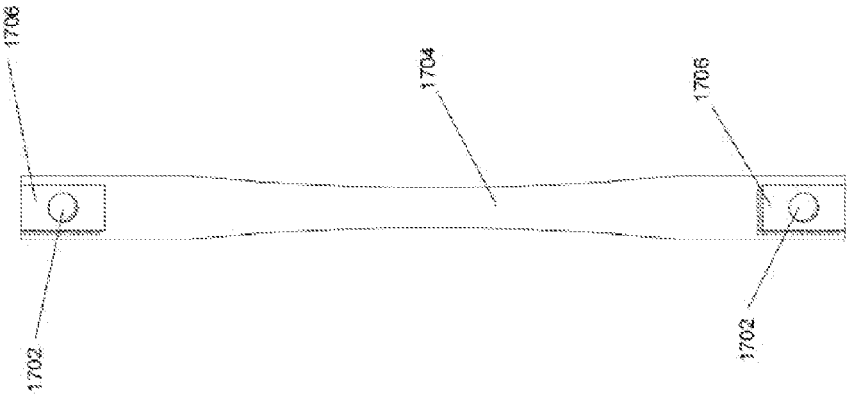

METHOD FOR ENHANCING THE FATIGUE LIFE OF A STRUCTURE

CLAIM OF PRIORITY

The following is a divisional application that claims priority to U.S. patent application Ser. No. 12/687,840, filed Jan. 14, 2010, now U.S. Pat. No. 8,202,378, and U.S. Provisional Patent Application No. 61/144,705, filed Jan. 14, 2009, the complete contents of which are hereby incorporated by reference.

BACKGROUND

1. Field of the Invention

The invention relates generally to structural connections and more particularly to systems and methods for enhancing structural connection performance and facilitating failure detection.

2. Background

Detection of failures and/or potential failures in fatigue-critical connections in structures has long been problematic. For many years, structural fuses, as depicted in FIG. 1, have been used to assist in detection of fatigue failures. However, due to difficulty with inspection and subsequently early identification of failures and/or potential failures, such structural fuses have not been utilized in many structures.

Connection enhancement methods and systems have existed since the beginning of modern construction. These systems range from cover-plated systems, as depicted in FIGS. 2a & b, to weld tapering and other mechanisms. In the typical reinforcement depicted in FIGS. 2a-b, a primary member 202 is bonded with a reinforcing member 204 via a perimeter fillet weld. In alternate materials and in alternate configurations, various bonding and reinforcing techniques are employed. However, all these techniques involve covering the critical connection with materials that generally do not allow for direct inspection of the underlying connection, and/or prevent ideal stress distribution profiles from being attained.

Additionally, it is important to have an effective method for preventing the propagation of existing fatigue cracks in bridge girders and other structures. A common technique used to prevent such propagation is the drilling of crack-stop holes at crack tips. By doing so, stress concentrations at the crack tips are reduced and fatigue life of the bridge is extended. However, mathematical formulae for determining idyllic sizes of crack-stop holes often results in crack-stop diameters larger than can be practically drilled; physical limitations force crack-stop holes to be undersized in the field. Thus, a method is needed to strengthen and/or expand undersized crack-stop holes.

What is needed is a system and method that can provide fatigue enhancement and, in some embodiments, provide a visual indication of the fatigue state of the connection. It is also desirable to have a method for fatigue enhancement of existing fractures and/or undersized crack-stop holes.

BRIEF DESCRIPTION OF THE DRAWINGS

FIG. 4 depicts an embodiment of a reinforcement device assembly testing system.

FIG. 17a depicts a view of the longitudinal plane of a girder-stiffener assembly utilizing crack-stop holes.

FIG. 17b depicts a top view of a steel bar utilizing CFRP material bonded to crack-stop holes.

DETAILED DESCRIPTION

Figure 1:
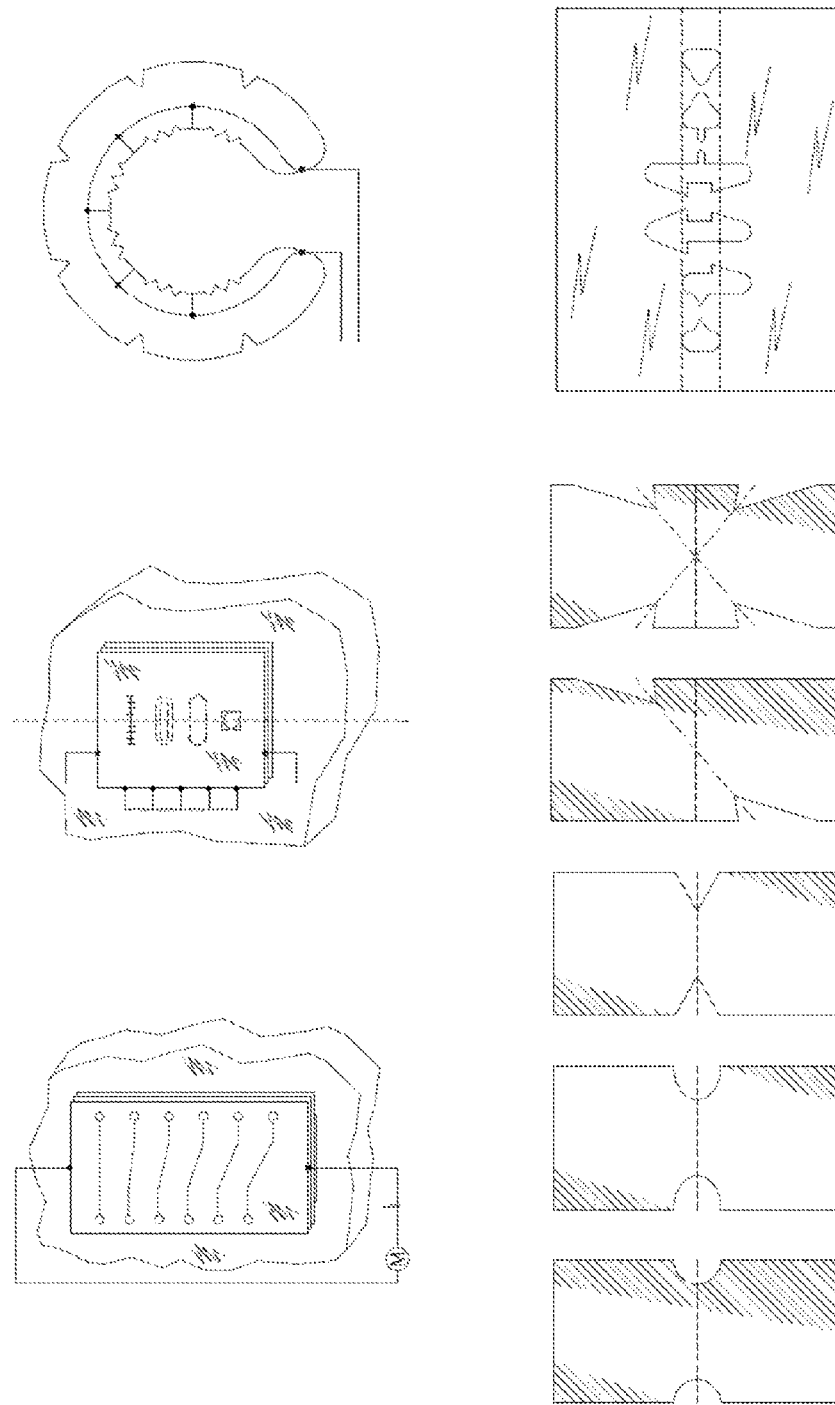
FIG. 1 depicts an embodiment of an existing typical fatigue fuse.
Figure 2:
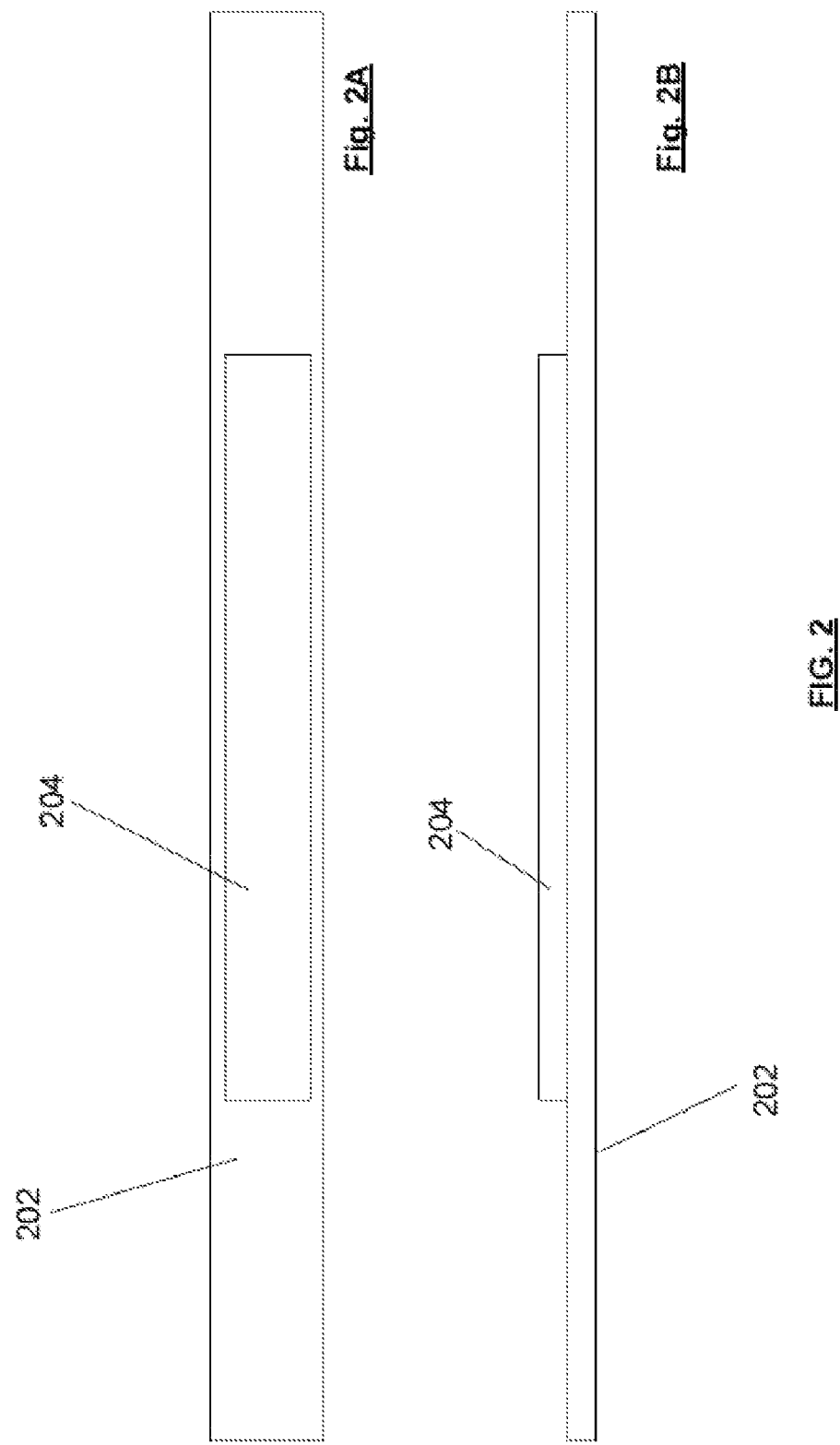
FIGS. 2a-2b depict plane and elevation views of an embodiment of a typical reinforced connection of a steel bar.
Figure 3:
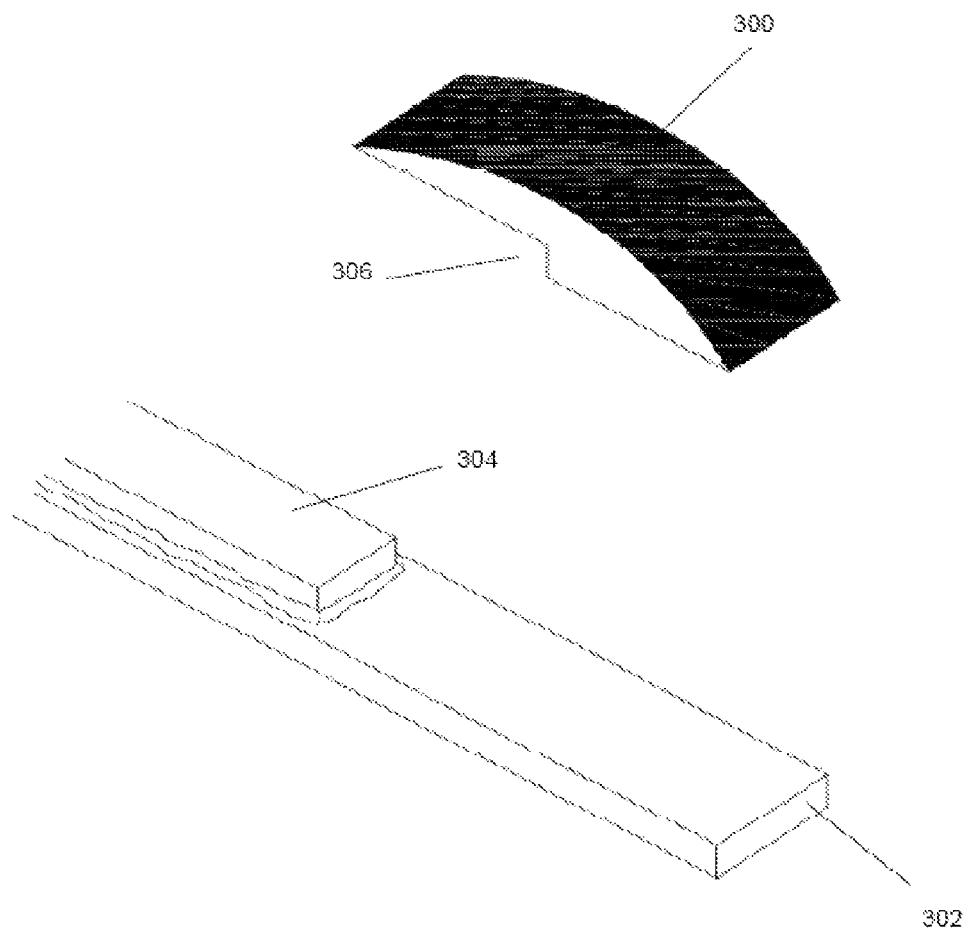
FIG. 3 depicts a perspective view of one embodiment of a reinforcement device adapted to couple with primary and secondary members.

FIG. 3 depicts a reinforcement device 300 that can be used with any known and/or convenient type of structural system susceptible to fatigue problems (such as those induced by distortion and/or bending). A reinforcement device 300 can be used as a fatigue enhancement device that can help distribute stresses more evenly throughout a structure, and/or an indicator that can provide detection of fatigue problems before such fatigue results in actual structural failure.

A reinforcement device 300 can be made of Laminar Carbon Fiber Reinforced Plastic (CFRP) materials. CFRP materials can be made by stacking layers of graphite fibers and matrix/bonding material, and then subjecting the stack to heat and pressure. The heat, which can be supplied by an oven or heat press, can activate the matrix material, causing it to flow and completely surround the fibers. Application of pressure, which can be supplied by a vacuum bag, reduces the amount of air voids throughout the depth of the composite, thereby forcing air out with any excess matrix material. The relative volume of fractions of the voids, fibers, and matrix material in the finished composite, known as consolidation, can be used to categorize the quality of the composite. Composites with high levels of consolidation (low matrix volume fractions and negligible void volume fractions) have higher strength and stiffness characteristics than poorly consolidated composites and are more resistant to fracture propagation. A common matrix material for CFRP is resin epoxy. When activated through heat application, resin epoxy undergoes a chemical reaction in which the polymer molecules of the resin develop cross-linking and form a solid structure. This type of resin is known as thermo-set, which indicates that, after the cross-linked structure is formed, the resin will no longer flow plastically, even if re-heated to the original activation temperature.

In other embodiments, alternate materials can be used for a reinforcement device 300, such as glass fiber reinforced polymer (GFRP), aramid fiber reinforced polymer (AFRP), and/or any other known and/or convenient formable material. CFRP laminate, or any other type of fiber reinforced material, can be applied to a surface using a gravity-fed spray gun, or any other known and/or convenient method. In some embodiments, fatigue enhancement of a structure can be accomplished by minimizing de-bonding of a reinforcement device 300 from the structure such that a reinforcement device 300 can continually aid in stress distribution over a desired area of a structure.

In the embodiment depicted in FIG. 3, a reinforcement device 300 can be configured to selectively engage the connection between a primary member 302 and a secondary member 304, and can be comprised of boron-fiber enhanced, carbon-fiber-epoxy-impregnated CFRP. In the embodiment shown, a reinforcement device 300 can be comprised of 40 layers of CFRP of various lengths selected to obtain the desired arced cross-section, heat cured in a press at 350 degrees Fahrenheit under 14,000 pounds of pressure and subsequently cut with a diamond saw to obtain the final desired shape. However, in alternate embodiments, any other known and/or convenient formulation can be employed, and a reinforcement device 300 can be made of any other known and/or convenient material, including but not limited to those described above.

In some embodiments, a reinforcement device 300 can be configured to enhance the structural performance of the structural connection by decreasing the internal stresses. In some embodiments, the bond between a reinforcement device 300 and a primary member 302 and/or a secondary member 304 can be adapted to de-bond when a desired stress and/or strain and/or fatigue level is reached, as described in more detail below.

FIG. 4 depicts an embodiment of an assembly 401. In the embodiment depicted in FIG. 4a, the under-side of a primary member 302 can be fillet welded to the upper-side of a secondary member 304, which can span less than the full length of the primary member 302. In the embodiment depicted, two reinforcement devices 300 can be configured and/or shaped to conform to the primary member 302, secondary member 304, and the weld interface therebetween. An assembly 401 can be loaded under simply-supported conditions and under cyclic and/or periodic and/or random loading conditions, as depicted in FIG. 4b. In some embodiments, the loading conditions can range across any desired loads and/or stress and/or strain levels.

Figure 5:
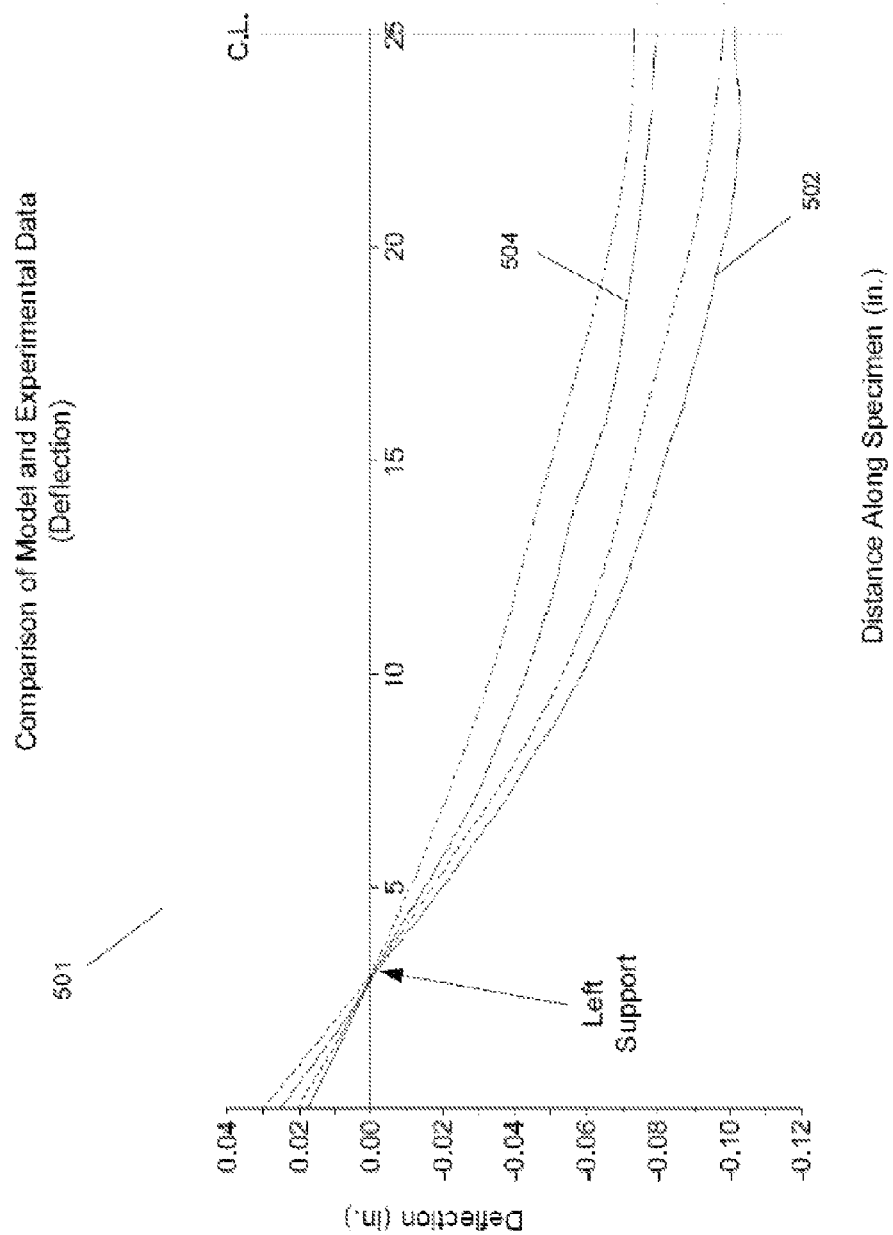
FIG. 5 depicts a deflection graph showing both standard and reinforced connection details.

FIG. 5 depicts a deflection graph 501 comparing an assembly having standard connection detail (i.e., perimeter fillet welded) and an assembly 401 that is enhanced with a reinforcement device 300. As shown by the graph 501, maximum deflection of the standard assembly depicted by line 502 is approximately 0.10 inches, whereas under the same loading conditions, deflection of the enhanced assembly 401 depicted by line 504 is approximately 0.08 inches. Thus, improved structural performance and fatigue enhancement can be achieved by inclusion of reinforcement devices 300. In some embodiments, any other known and/or convenient geometrical configuration of a reinforcement device 300 can be employed such that its stress, strain, and/or fatigue properties can exhibit results similar to those depicted in graph 501.

Figure 6:
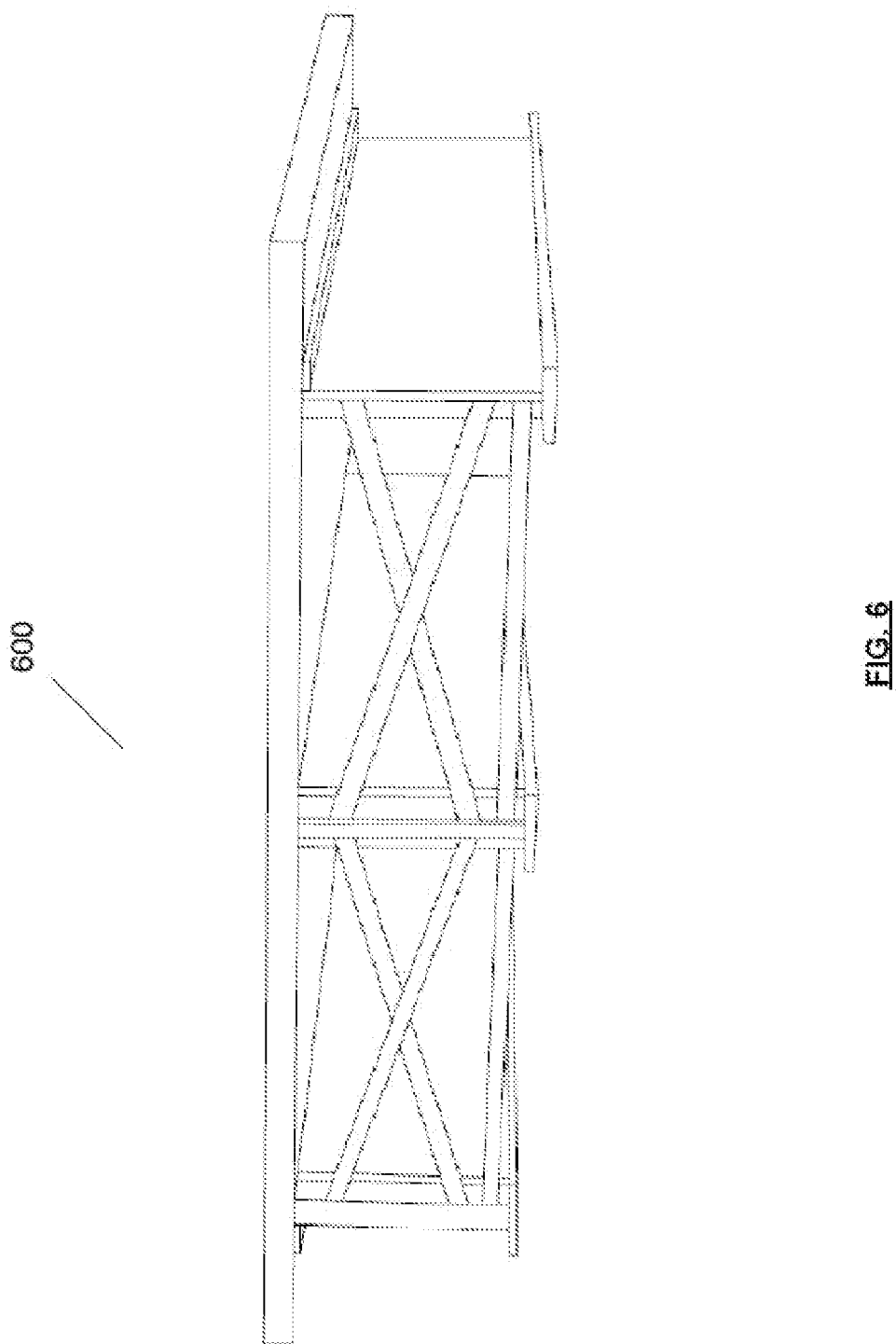
FIG. 6 depicts a girder bridge assembly having lateral X-bracing mid-span.
Figure 7:
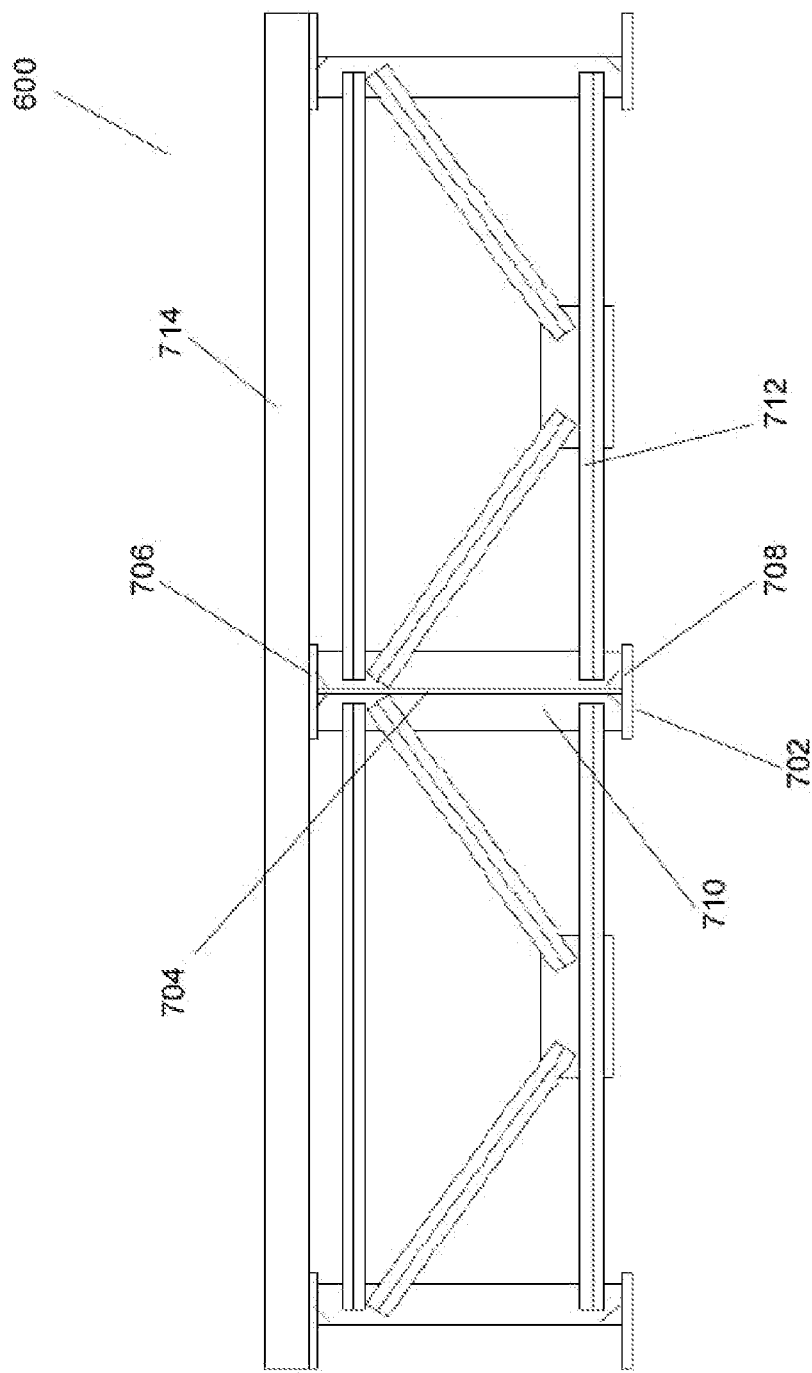
FIG. 7 depicts a cross-section view of mid-span lateral chevron bracing on a girder bridge assembly.
Figure 8:
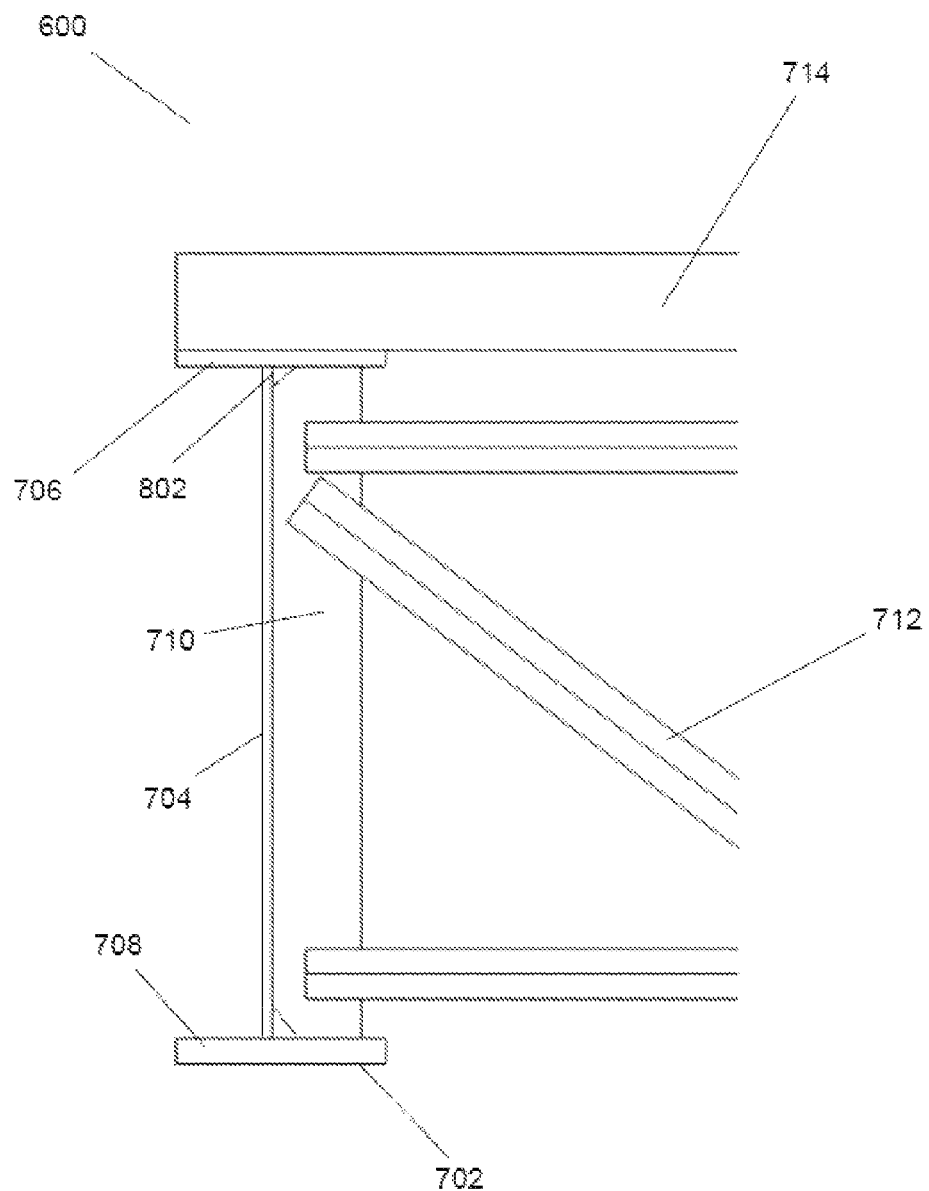
FIG. 8 depicts a partial front view of a girder assembly.

A reinforcement device 300 can also be used with a girder bridge assembly 600, which is depicted in FIG. 6. FIGS. 7-8 illustrate girder assemblies 600 without a reinforcement device 300. In the embodiment shown, a steel girder 702 can be comprised of a vertical connection plate 704 coupled with a top flange 706 and a bottom flange 708. A connection plate 704 can also be coupled with a vertical stiffener 710, which in turn can be coupled with a brace assembly 712. In some embodiments, a top flange 706 can be coupled with a deck 714. As shown in FIG. 8, a girder assembly 600 can also comprise a web gap region 802 proximate to the interface between a connection plate 704, stiffener 710, and flange 706 or 708.

Figure 9:
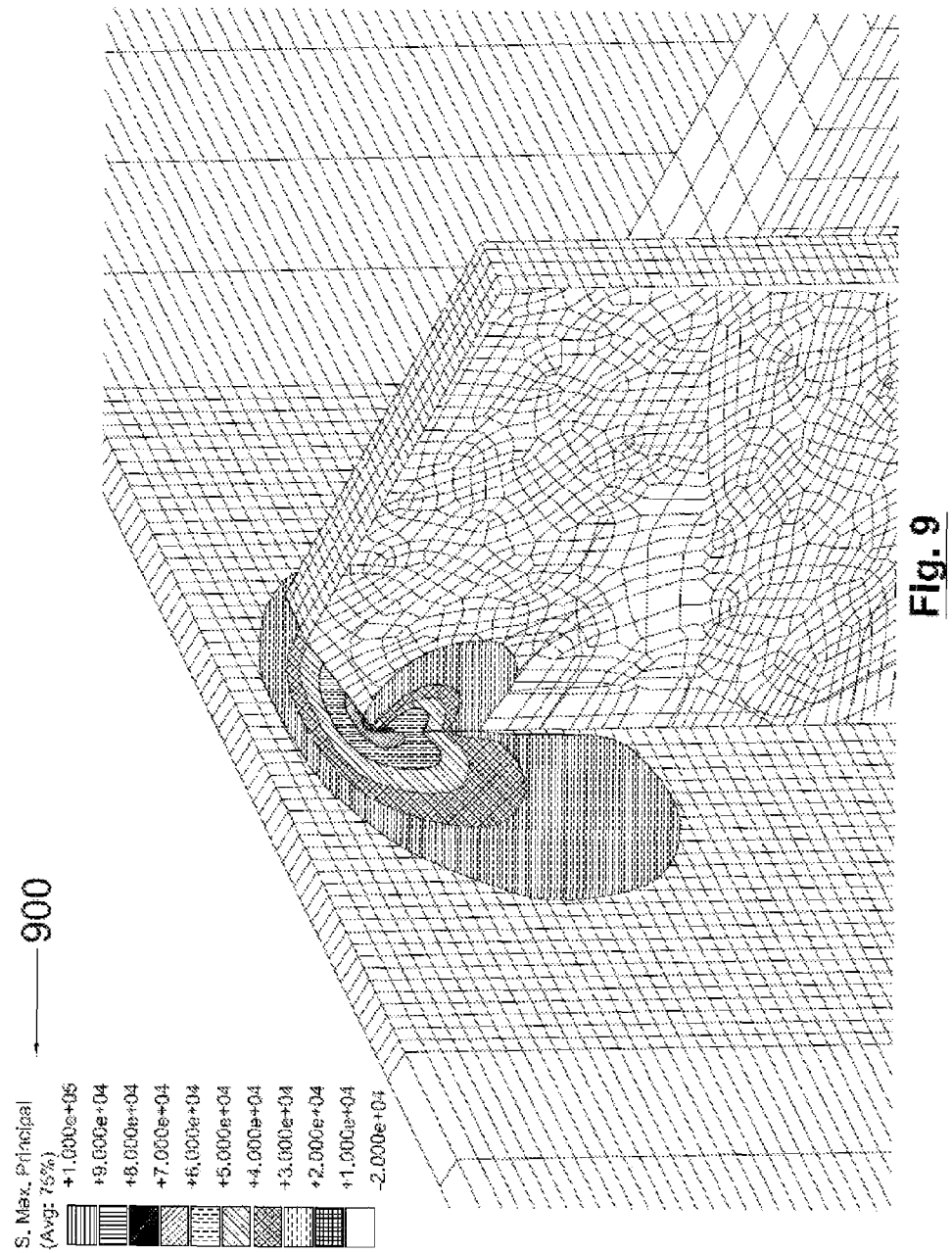
FIG. 9 depicts a maximum stress distribution profile for a girder assembly without a reinforcement device.
Figure 11:
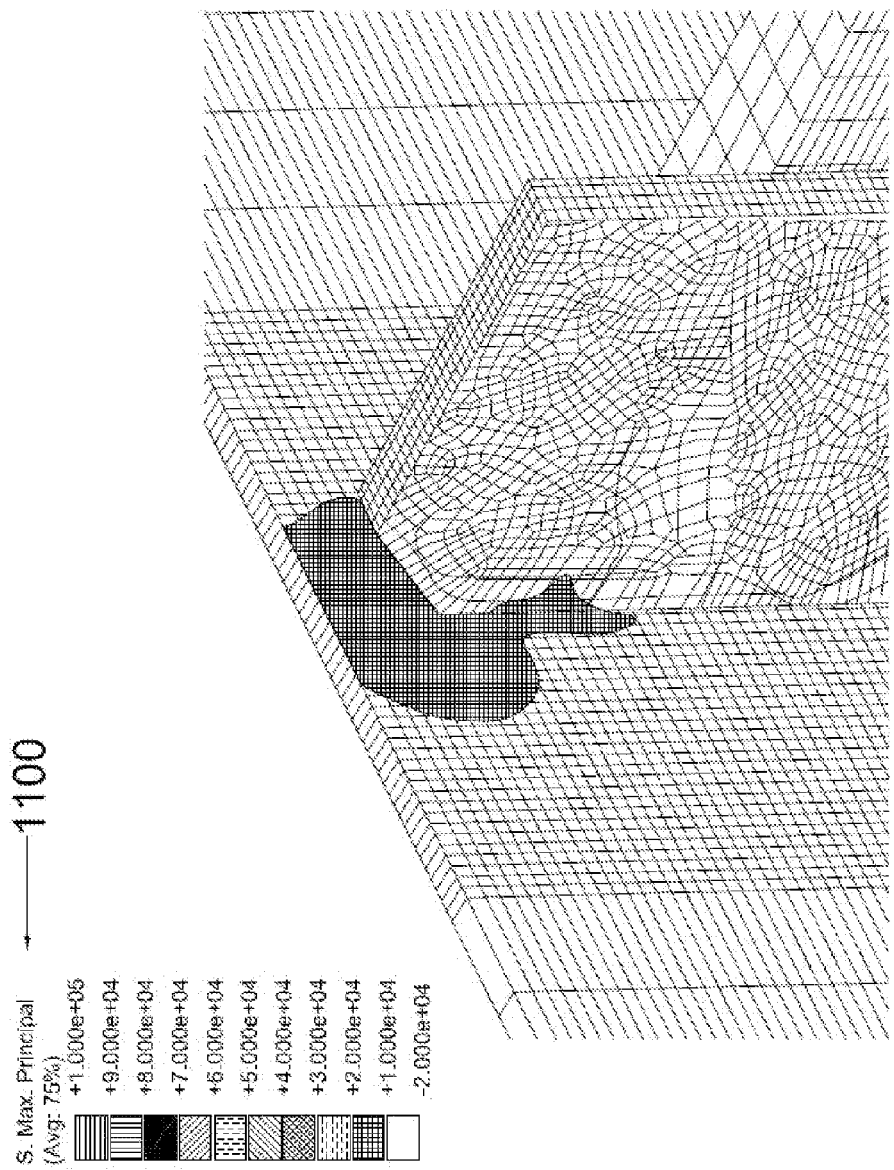
FIG. 11 depicts a maximum stress distribution profile for a girder assembly having a U-shaped reinforcement device coupled with its web gap region.

FIG. 9 depicts a maximum principal stress distribution profile 900 for a girder assembly 600 that does not utilize a reinforcement device 300. As compared to FIG. 11, which illustrates a maximum principal stress distribution profile 1100 for a girder assembly 600 utilizing a U-shaped reinforcement device 300 (described below), the stress demand at a web gap region 802 can be greatly reduced by retrofitting the assembly 600 with a reinforcement device 300.

Figure 10:
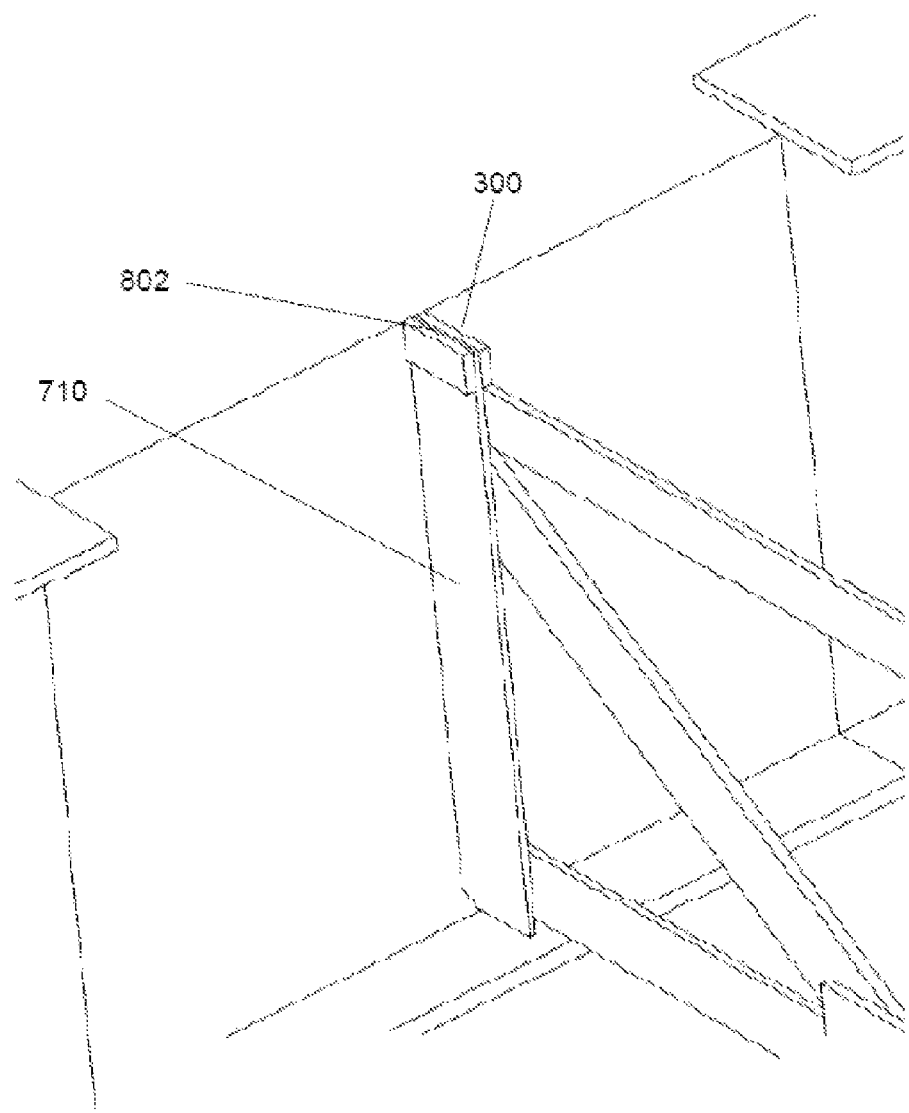
FIG. 10 depicts a perspective view of a U-shaped reinforcement device coupled with a girder assembly.
Figure 12:
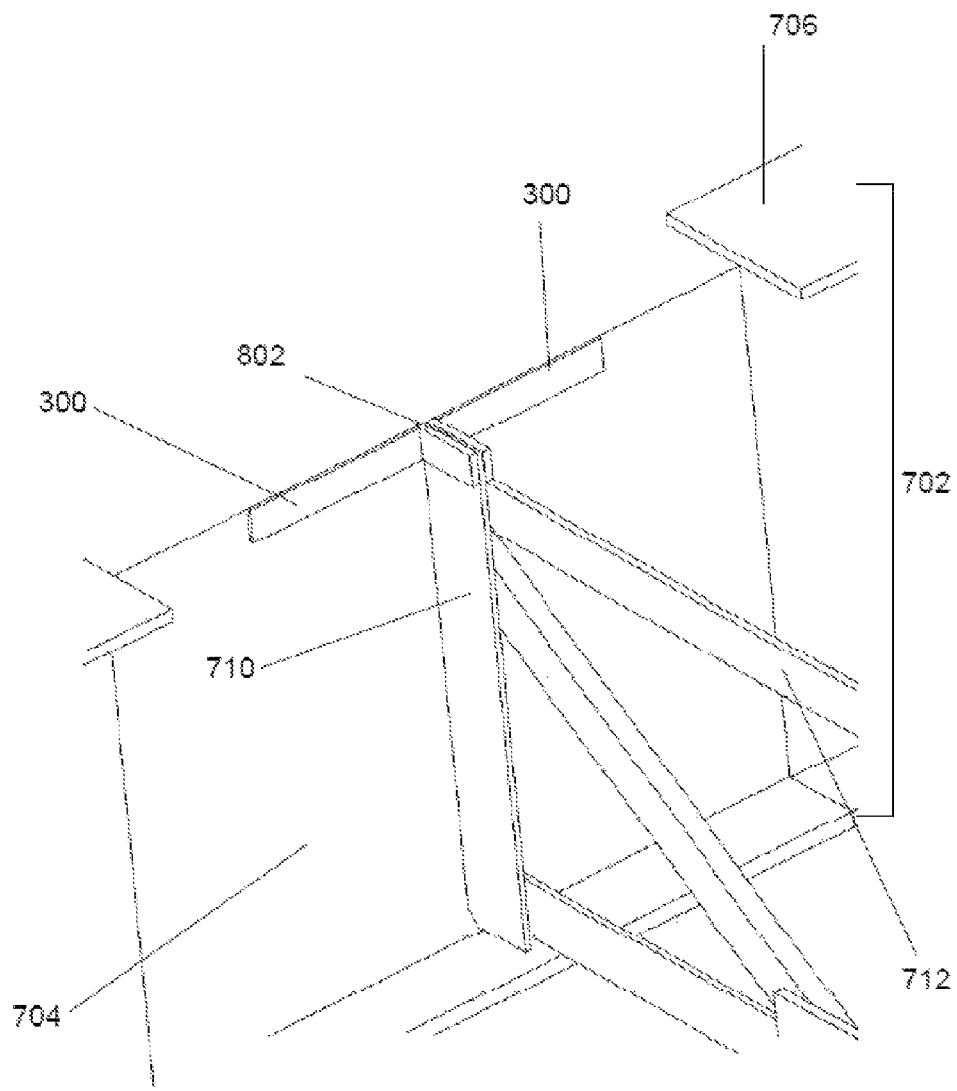
FIG. 12 depicts a perspective view of two L-shaped reinforcement devices coupled with a girder assembly.

In some embodiments, a reinforcement device 300 can have U-shaped or L-shaped geometry, as depicted in FIGS. 10 and 12, respectively. In the embodiment depicted in FIG. 10, a U-shaped reinforcement device 300 can be comprised of CFRP material, can surround a web gap region 802 and can be coupled with a stiffener 710 proximate to one of the stiffener's 710 ends. In some embodiments, a U-shaped reinforcement device 300 can have a maximum principal stress distribution profile 1100 similar to that shown in FIG. 11. In other embodiments, and depending on the material, dimensions, and geometrical characteristics of other elements within a girder assembly 600, utilization of a U-shaped reinforcement device 300 can result in different stress distribution profiles.

Referring to FIG. 12, at least one L-shaped reinforcement device 300 can be comprised of CFRP material, and can be laterally coupled with a stiffener 710 and longitudinally coupled with a connection plate 704. In the embodiment shown, two L-shaped reinforcement devices 300 can be coupled with opposing sides of a stiffener 710, proximate to the top end of the stiffener 710, such that a web gap region 802 can be substantially surrounded.

A reinforcement device 300 can be bonded to steel members 302 304 (FIG. 3) and/or a girder assembly 600 (FIGS. 6-8) using any known and/or convenient commercially-available structural adhesive. In some embodiments, Hysol® 9412 epoxy adhesive 306 (which can exhibit tensile lap shear strength of 4000 psi on etched aluminum after curing for 5 days at 77 degrees Fahrenheit) can be used. In alternate embodiments, a steel surface of members 302, 304, 600, or any other known and/or convenient metal structure can be prepared using a standard hand grinder and/or other roughening material and/or mechanism, and/or degreased using isopropyl alcohol and/or any other known and/or convenient grease-cutting material.

In some embodiments, the bond between a reinforcement device 300 and primary member 302, secondary member 304, girder assembly 600 surfaces, and/or any other known and/or convenient element can be cured at room temperature for any desired timeframe. In some embodiments the bond can be cured for a minimum of 48 hours before any load is applied. However, in alternate embodiments any desired bond-curing mechanism and/or method can be employed under any desired conditions for any desired period under any desired pressure and/or pressures and/or any desired temperature and/or temperature gradient and/or profile.

In addition to providing fatigue enhancement, in some embodiments a reinforcement device 300 can also act as an indicator, such that fatigue problems can be anticipated and repaired before failure occurs. A reinforcement device 300 can act as an indicator of fatigue in predetermined areas of a structure by de-bonding from the structure. A de-bonding mechanism can be based on either adhesive failure or structural failure of the reinforcement device 300, depending on construction-specific parameters and desired operation.

In one embodiment, a reinforcement device 300 can act as an indicator of fatigue problems by de-bonding with the structure to which it is bonded as the result of adhesive 306 failure. Bonding adhesive 306 can be selected such that it can fail at stress and/or strain levels less than the maximum stress threshold of the structure to which it is coupled, and less than the maximum stress threshold of a reinforcement device 300. In some embodiments, adhesive 306 can be chosen such that it can fail when fatigue problems within a structure occur but prior to any visible signs of distress. In other embodiments, adhesive 306 can be chosen such that it can de-bond at any other known and/or convenient time with respect to the maximum stress and/or strain threshold of the structure to which it is coupled. As an example, in FIG. 12, a L-shaped reinforcement device 300 can at least partially de-bond from a girder assembly 600 when fatigue-induced problems have occurred but are not yet visible to the naked eye. This can alert inspection workers or other observers to potentially harmful structural damage such that precautions can be taken to prevent structural damage from actually occurring.

In another embodiment, a reinforcement device 300 can act as an indicator of fatigue problems by de-bonding with the structure to which it is bonded as the result of structural failure of the reinforcement device 300 (i.e., the reinforcement device 300 can fail, not an adhesive 306). The material composition of a reinforcement device 300 can be selected such that it can fail at stress and/or strain levels less than the maximum stress threshold of the structure to which it is coupled. In such an embodiment, the adhesive 306 used to bond a reinforcement device 300 to a structure can have maximum stress and/or stress thresholds higher than those of the reinforcement device 300. In some embodiments, reinforcement device 300 material can be chosen such that it can de-bond when fatigue problems occur but prior to any visible signs of distress. In other embodiments, reinforcement device 300 material can be chosen such that it can de-bond at any other known and/or convenient point in time with respect to the maximum stress and/or strain threshold of the structure to which it is coupled. As an example, in FIG. 10 the U-shaped reinforcement device 300 can have properties such that at a desired stress, strain, or fatigue level, it can fracture and/or de-bond from the structure, or otherwise have visible physical signs of failure.

Figure 13:
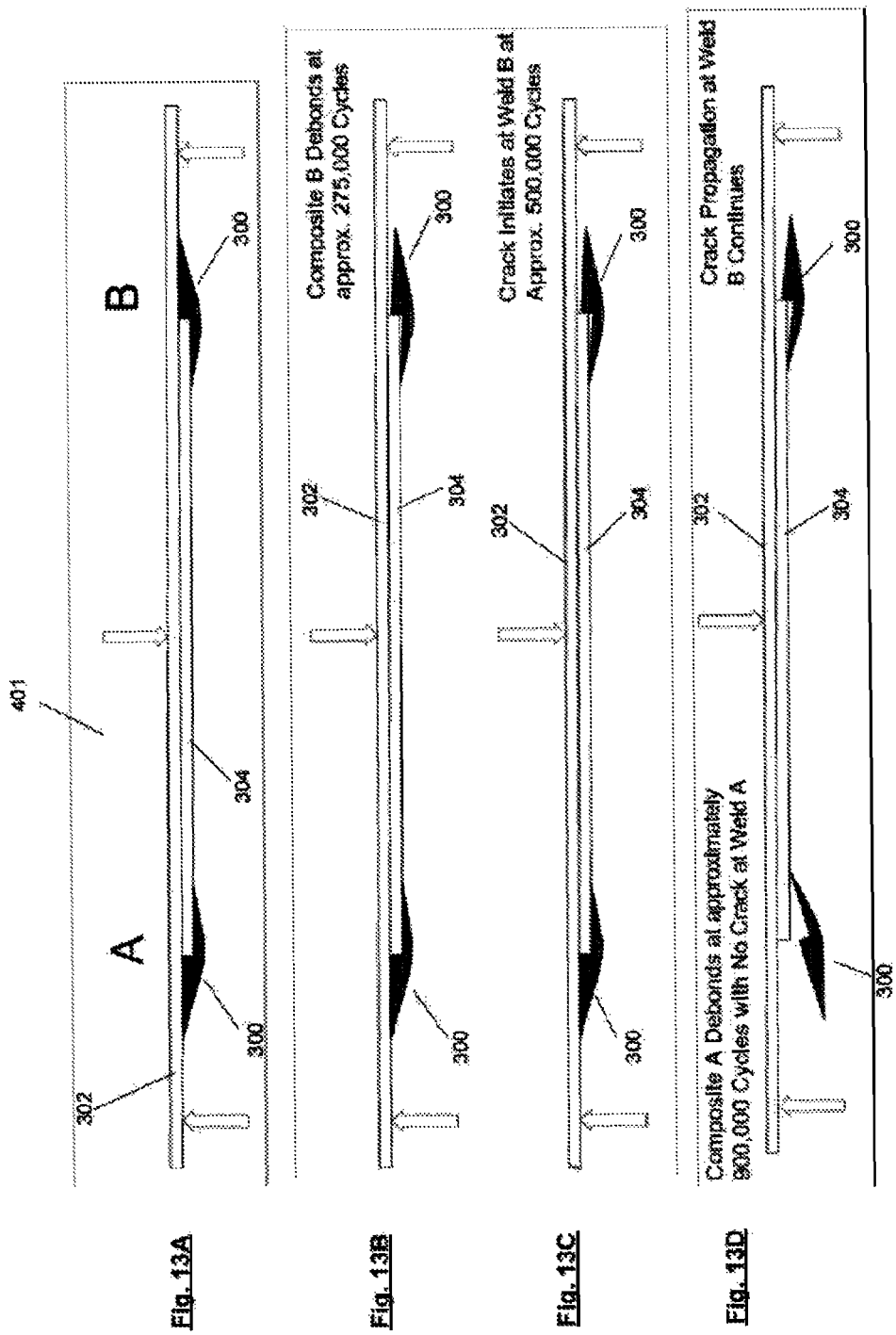
FIGS. 13a-13d depict embodiments of a loaded assembly under various conditions.

Another example of de-bonding of a reinforcement device 300 is depicted in FIG. 13. In FIGS. 13a-13d, a reinforcement device 300 can de-bond as a result of its own structural failure, or as a result of adhesive 306 failure. FIGS. 13a-13b depict embodiments of loaded connections under increasing simply-supported cyclic loading. In the embodiment depicted in 13a, an initial condition is depicted wherein a secondary member 304 can be perimeter fillet welded to the underside of a primary member 302, and reinforcement devices 300 can be bonded over the interface of the primary member 302 and secondary member 304, thereby forming an assembly 401.

The embodiment depicted in FIG. 13b shows the assembly 401 after undergoing a first number of cyclic loadings. A first reinforcement device 300 is depicted as being partially de-bonded from at least one of the primary and secondary members 302 304, thus clearly visually indicating that a prescribed stress, strain and/or fatigue level has been reached to trigger such de-bonding.

The embodiment depicted in FIG. 13c shows the assembly 401 after undergoing a second number of cyclic loadings. A first reinforcement device 300 is depicted as being further de-bonded from at least one of the primary and secondary members 302 304, thus clearly visually indicating that a prescribed stress, strain and/or fatigue level has been reached to trigger such de-bonding.

The embodiment depicted in FIG. 13d shows the assembly 401 after undergoing a third number of cyclic loadings. First and second reinforcement devices 302 304 are each depicted as being de-bonded from at least one of the primary and secondary members, thus clearly visually indicating that a prescribed stress, strain, fatigue and/or failure level has been reached to trigger such de-bonding.

Figure 14:
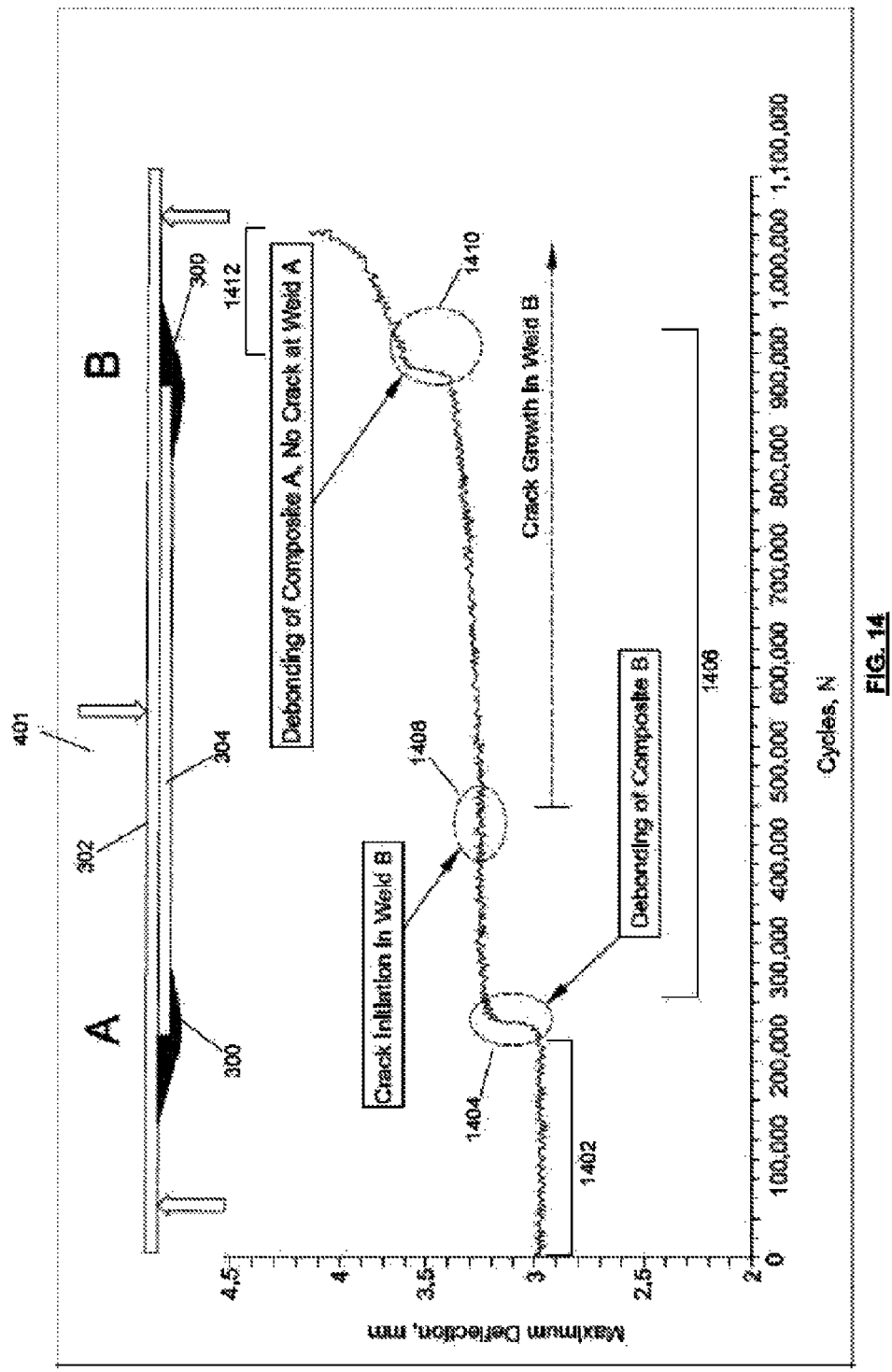
FIG. 14 depicts an embodiment of empirical data obtained from testing of the embodiment depicted in FIGS. 13a-13d.

FIG. 14 depicts an embodiment of empirical data obtained from testing of the embodiment depicted in FIGS. 13a-13d. Region 1402 depicts a region of inelastic response prior to de-bonding of a first reinforcement device 300. As shown by the data, prior to de-bonding of a first reinforcement device 300, an assembly 401 exhibited a generally elastic and predictable response when subjected to cyclic loading. Within a region 1404, a first reinforcement device 300 de-bonded from an assembly 401, prior to initiation of visible fracture of the connection between primary and secondary members 302 304, thus providing a clear visual indication of imminent failure of the connection prior to visible crack initiation at the connection. Region 1406 depicts a partially inelastic response of an assembly 401, and region 1408 depicts a region in which a visible failure of the connection occurs.

Region 1410 depicts a range of cyclic loadings over which a second reinforcement device 300 de-bonds from the assembly 401, providing a clear visual indication of imminent failure of the underlying connection. Moreover, during the de-bonding of a reinforcement device 300 from an assembly 401, the structural properties of the assembly 401 change to further indicate imminent failure of the assembly 401. Region 1412 depicts a substantially inelastic response of an assembly 401 prior to a possible life-safety failure of the assembly 401.

In operation, region 1404 depicts a marked change in structural properties of an assembly 401, other than a catastrophic and/or life-safety-issue failure. Thus, in operation, de-bonding of a reinforcement device 300 can occur prior to a predetermined failure of a connection which results in a change in the structural properties of the assembly 401, both of which can provide a clear visual indication of imminent failure prior to actual failure of the assembly 401.

The aforementioned de-bonding mechanisms represent a few embodiments of the current invention, however in other embodiments a reinforcement device 300 can de-bond from a structure in any other known and/or convenient manner and/or by any other mechanism.

Figure 15:
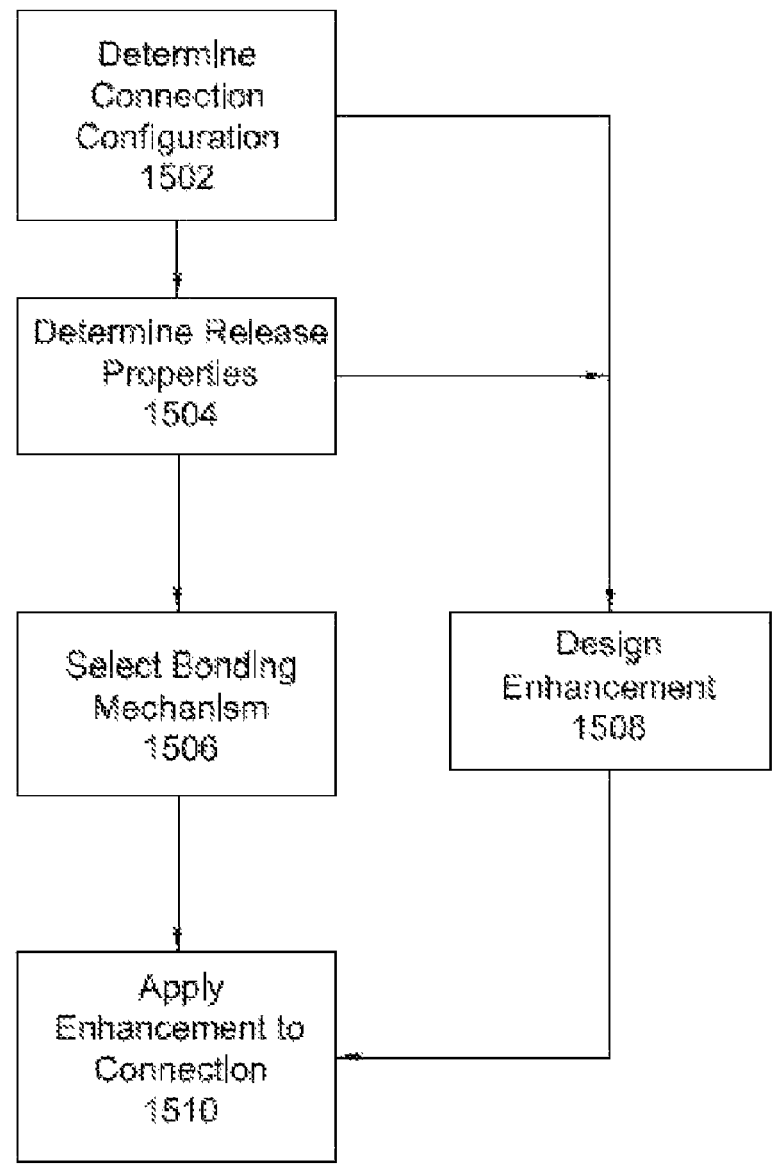
FIG. 15 depicts an embodiment of a method of fatigue enhancement of a connection.

FIG. 15 depicts an embodiment of a method of fatigue enhancement of a connection. At step 1502, a connection configuration can be determined which can include generating a mold of the geometry of the connection and/or obtaining data regarding the geometric configuration and/or stresses, strains, and/or loads on the connection. Release properties can be determined at step 1504, which can include stresses, strains and/or fatigue levels. In step 1506, a desired bonding mechanism can be selected based at least in part on the predetermined release properties 1504. Such bonding mechanism can be any known and/or convenient bonding mechanism capable of bonding a reinforcement device 300 and the desired structural members. In some embodiments, the bonding mechanism can be epoxy resin, but in alternate embodiment any known and/or convenient bonding mechanism can be used.

In the embodiment depicted in FIG. 15, at step 1508 a reinforcement device 300 can be designed based, at least in part, on at least one of the determined geometric configurations 1502, the determined release properties 1504 and/or the selected bonding mechanism 1506. In some embodiments a reinforcement device 300 can be configured to de-bond from an assembly 401 or 600 as a result of fracture or other structural failure of the reinforcement device 300. In other embodiments, a reinforcement device 300 can be configured to de-bond as the result of adhesive 306 failure. However, in alternate embodiments a reinforcement device 300 can be configured to selectively fail in any manner such that failure of the reinforcement device 300 can be readily perceived by an observer.

In step 1510, a reinforcement device 300 can be applied to a structural member, such that the application of the reinforcement device 300 can enhance structural performance of the connection and/or assembly 401 and/or 600. Such enhancement can include increasing the stiffness of the assembly 401 and/or 600, the stress capacities, strain capacities, fatigue limits and/or any other known and/or desired structural property of the assembly 401 and/or 600. In operation, prior to reaching a critical/predetermined stress, strain, and/or fatigue level and/or other desired structural property limitation, the reinforcement device 300 can de-bond from the assembly 401 and/or 600 and/or fail in a readily perceivable manner.

Figure 16:
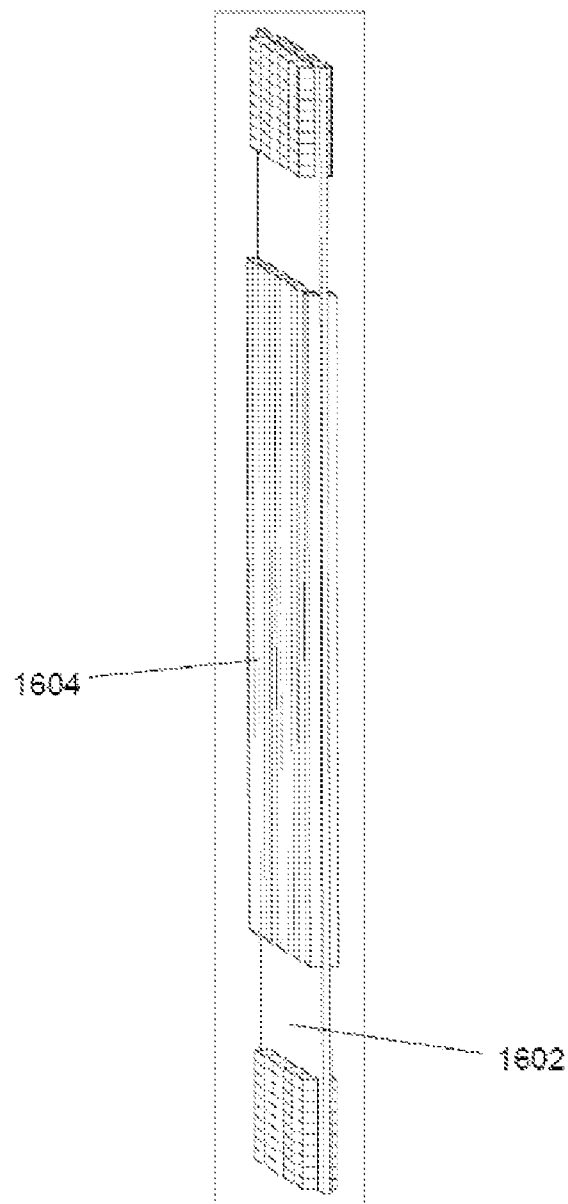
FIG. 16 depicts one embodiment of a cracked steel specimen coated with CFRP material.
Figure 16A:
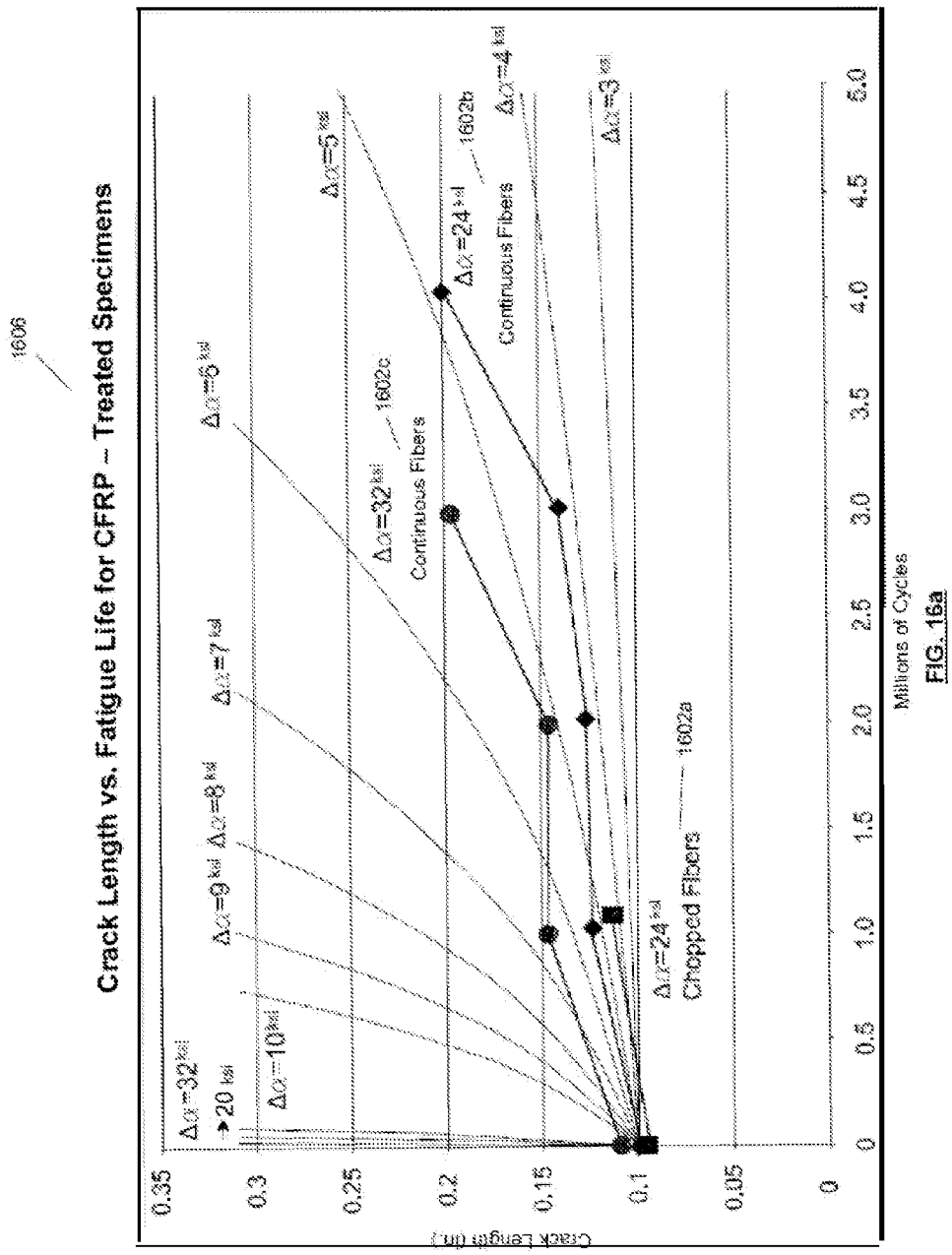
FIG. 16a depicts a crack length vs. fatigue life graph for CFRP-treated specimens subjected to differing load conditions.

Another aspect of the current invention involves preventing fatigue-induced structural failure by retrofitting cracked metal with chopped-fiber material to limit further crack growth. FIG. 16 depicts one embodiment of a cracked steel specimen 1602 that has been reinforced with CFRP material 1604, thus stiffening the specimen 1602 and limiting fracture propagation. FIG. 16a depicts a crack length vs. fatigue life graph 1606. A specimen 1602a coated with chopped carbon fibers was subjected to fatigue loading in tension at a stress range of 24 ksi. Specimens 1602a 1602b were coated with continuous carbon fibers and subjected to fatigue loading at stress ranges of 24 ksi and 32 ksi, respectively. Under these conditions, significant fatigue enhancement gains can be made by coating a cracked specimen 1602 with CFRP materials 1604.

As illustrated in FIG. 17, yet another aspect of the current invention involves treating undersized crack-stop holes 1702 to improve their effectiveness in preventing fatigue crack propagation. As shown in FIG. 17a, crack-stop holes 1702 can be made at the ends of a crack 1703 in a steel structure. FIG. 17b depicts a steel bar 1704 comprising undersized crack-stop holes 1702. In some embodiments, the CFRP-retrofitting technique described above with respect to FIG. 16 can be used in conjunction with crack-stop holes 1702 to provide further fatigue enhancement of a steel bar 1704. FIG. 17b illustrates such CFRP coating 1706 coupled with crack-stop holes 1702.

Figure 18:
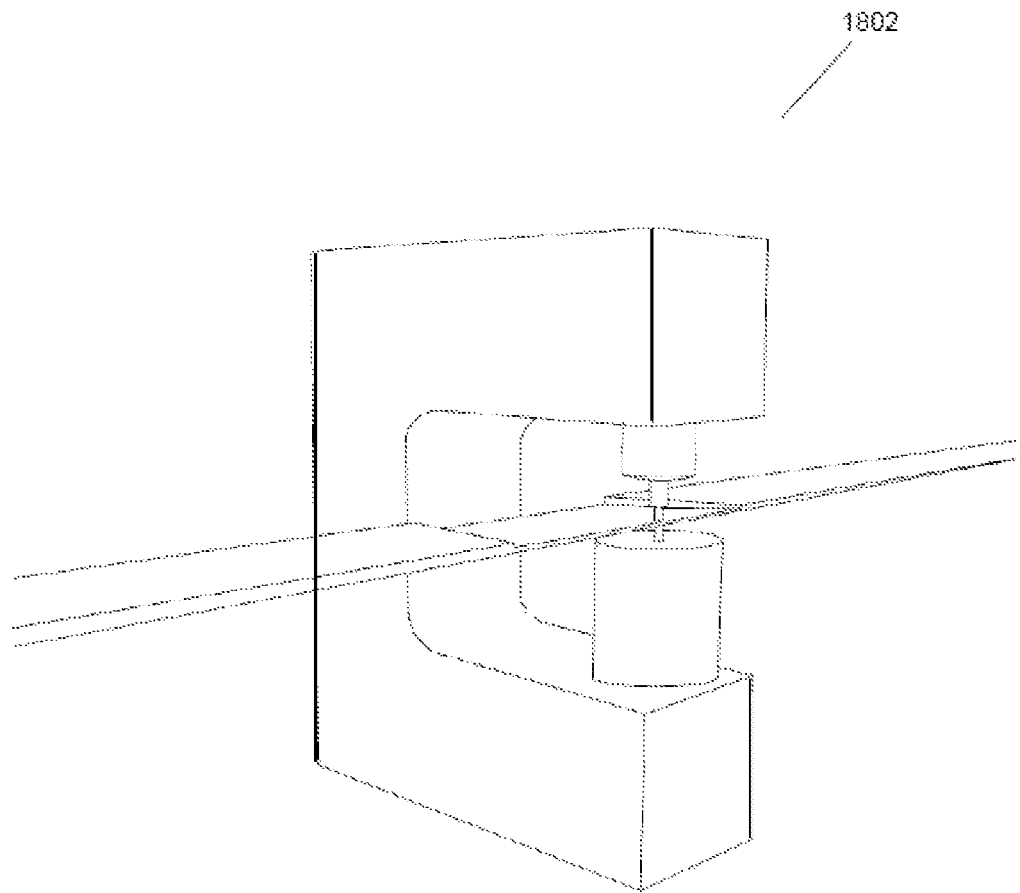
FIG. 18 depicts one embodiment of a crack-stop hole enlargement tool.

In some embodiments, crack-stop holes 1702 can be created using the following technique. In order to extend fatigue life in a steel specimen 1704, sufficient compressive residual stresses should be achieved. Piezoelectric transducers can be used to dynamically work and cold-expand the volume of steel plate surrounding a crack-stop hole's 1702 inner surface. A piezoelectric impact compressive kinetics (PICK) apparatus 1802, depicted in FIG. 18, can utilize piezoelectric transducers designed to convert electrical energy into mechanical vibration, plastically deforming an aluminum plug inside a hole 1702 and causing the hole 1702 to expand. Subsequently, an aluminum plug can be carefully removed from the hole 1702 exploiting the thermal mismatch between steel and aluminum. This PICK technique can therefore result in expansion of a crack-stop hole 1702 to its ideal diameter or at least substantially close to it. Subsequently, as described above, in some embodiments CFRP-material can be bonded to and around a crack-stop hole 1702, thus providing additional fatigue enhancement of a steel bar 1704. In other embodiments, fatigue enhancement techniques utilizing CFRP-material 1706 and/or crack-stop hole 1702 enlargement can be employed in conjunction with any other known and/or convenient structure and/or material.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method for enhancing the fatigue life of a structure comprising:
    forming a crack-stop hole in said structure;
    inserting a plug in said crack-stop hole;
    applying a mechanical vibration to said plug such that said plug is deformed inside said crack-stop hole, thereby causing said crack-stop hole to undergo expansion;
    wherein said expansion of said crack-stop hole enhances the fatigue life of said structure.

2. The method of claim 1, wherein said plug is comprised of aluminum.

3. The method of claim 1, wherein said structure is comprised of steel.

4. The method of claim 1, wherein a transducer converts electrical energy into said mechanical vibration.

5. The method of claim 1, further comprising the step of bonding a fiber-reinforced composite member to said crack-stop hole.

6. The method of claim 5, wherein said fiber-reinforced composite member is selected from the group consisting of a laminar carbon fiber reinforced plastic, boron fiber enhanced, carbon-fiber-epoxy-impregnated carbon fiber reinforced plastic, glass fiber reinforced polymer, and aramid fiber reinforced polymer.

7. The method of claim 1, further comprising the step of removing said plug from said crack-stop hole.

* * * * *